(12) United States Patent
Fathollahi

(10) Patent No.: US 10,097,922 B2
(45) Date of Patent: Oct. 9, 2018

(54) PORTABLE SPEAKER WITH FEATURES FOR VEHICLE INTEGRATION AND SYSTEM

(71) Applicant: Zagg Amplified, Inc., Midvale, UT (US)

(72) Inventor: Andy Fathollahi, Corona Del Mar, CA (US)

(73) Assignee: ZAGG Amplified, Inc., Salt Lake City, UT (US)

( * ) Notice: Subject to any disclaimer, the term of this patent is extended or adjusted under 35 U.S.C. 154(b) by 0 days.

(21) Appl. No.: 15/444,326

(22) Filed: Feb. 27, 2017

(65) Prior Publication Data

US 2017/0251305 A1    Aug. 31, 2017

Related U.S. Application Data

(60) Provisional application No. 62/300,122, filed on Feb. 26, 2016.

(51) Int. Cl.

| | |
|---|---|
| *H04R 5/02* | (2006.01) |
| *H04R 1/02* | (2006.01) |
| *H04R 3/12* | (2006.01) |
| *H04R 5/04* | (2006.01) |
| *G06F 3/16* | (2006.01) |

(52) U.S. Cl.
CPC ............... *H04R 5/02* (2013.01); *G06F 3/162* (2013.01); *H04R 1/025* (2013.01); *H04R 3/12* (2013.01); *H04R 5/04* (2013.01); *H04R 2420/07* (2013.01); *H04R 2499/13* (2013.01)

(58) Field of Classification Search
CPC ... H04R 5/02; H04R 5/04; H04R 3/12; H04R 1/025; H04R 2420/07; H04R 2499/13; G06F 3/162
See application file for complete search history.

(56) References Cited

U.S. PATENT DOCUMENTS

| | | | | |
|---|---|---|---|---|
| 5,864,627 | A * | 1/1999 | Kim | B60R 11/0205 381/86 |
| 7,146,010 | B1 * | 12/2006 | Heed | H04R 5/04 381/1 |
| 2009/0296955 | A1 * | 12/2009 | Shaffer | H04R 1/028 381/86 |
| 2015/0201255 | A1 * | 7/2015 | Porter | H04R 1/00 381/334 |
| 2017/0105069 | A1 * | 4/2017 | Mezzomo | H04R 3/14 |
| 2017/0142508 | A1 * | 5/2017 | Prommersberger | H04R 1/026 |

* cited by examiner

*Primary Examiner* — Ping Lee
(74) *Attorney, Agent, or Firm* — Manatt, Phelps & Phillips, LLP

(57) ABSTRACT

A portable speaker unit that includes a battery-powered, portable wireless speaker and can be seamlessly incorporated and operate as a speaker element of the vehicle speaker system. The portable speaker unit includes 2.1 channel audio capability with individually sealed speaker chambers for each of the 3 speakers within a housing. The portable speaker unit can be electrically and mechanically interfaced with the vehicle speaker system through a vehicle mount. The portable speaker unit can also operate as a portable wireless speaker when removed from the vehicle interface.

8 Claims, 8 Drawing Sheets

PORTABLE SPEAKER WITH FEATURES FOR VEHICLE INTEGRATION AND SYSTEM

CROSS-REFERENCE TO RELATED APPLICATIONS

This application claims the benefit of priority under 35 U.S.C. § 119(e) from U.S. Provisional Application No. 62/300,122, filed on Feb. 26, 2016. The above application is hereby incorporated herein by reference in its entirety and is to be considered a part of this specification.

BACKGROUND INFORMATION

Field

This patent application relates generally to a vehicle speaker system. This application relates more particularly to a vehicle speaker system incorporating one or more portable main speaker units adapted to operate as an element of the vehicle speaker system when electrically and mechanically interfaced with a vehicle speaker system and to operate as a portable wireless speaker when removed from the vehicle interface.

Description of the Related Art

Modern vehicle speaker systems include audio speaker systems to entertain drivers and passengers. These audio speaker systems often incorporate a number of speakers secured to the vehicle body, controlled by a stereo system or mixer, and powered by the vehicle's electrical system. Such audio speaker systems include a plurality of speakers adapted to provide sound at different frequencies, at different volumes, and from different locations to provide a high quality listening experience.

Additionally portable speakers are used more and more in varied indoor and outdoor environments including camping, travel, leisure, beach, boating, fishing, surfing, off-road driving, and other rugged and potentially weather and water prone environments. These speakers are generally portable, wireless, and battery powered, and may be adapted to survive and continue operating in rough, dusty, and/or damp environments.

Applicants here have recognized the potential for a vehicle speaker system to continue to meet the needs of vehicle operators even after the operators depart from the vehicle. Accordingly, a need is recognized here for a vehicle speaker system including a portable wireless speaker that is particularly adapted to operate as an element of the vehicle speaker system when electrically and mechanically interfaced with the vehicle speaker system and to operate as a portable, wireless speaker when removed from the vehicle interface.

SUMMARY

The subject matter of this disclosure is generally directed to vehicle speaker systems incorporating one or more portable main speaker units adapted to operate as an element of the vehicle speaker system when electrically and mechanically interfaced with a vehicle speaker system and to operate as a portable wireless speaker when removed from the vehicle interface. Various aspects thereof are described herein.

In one aspect, the speaker system includes a portable speaker unit that includes mechanical and electrical connectors adapted to removably interface with a vehicle mount incorporated into a vehicle speaker system that, when connected to the vehicle speaker system, seamlessly integrate to supplement the operational features of the system. The portable speaker unit may include an internal enclosure or housing that houses a rechargeable battery, a wireless module, electrical interfaces, mechanical interfaces, a security lock, one or more audio speakers, and the supporting electronic circuitry to operate the portable speaker unit.

In another aspect, the portable speaker unit includes multiple audio speakers of different types, such as tweeters, midrange speakers, woofers, subwoofers. The portable speaker unit may use a first group of the audio speakers when used as a portable wireless speaker and a second group of the audio speakers when connected to the vehicle interface. The first group of audio speakers may partially overlap with the second group of audio speakers. In one implementation, the stereo speaker unit includes three audio speakers, one of which is a subwoofer, forming a 2.1 system including a left channel, a right channel, and the subwoofer. In one implementation, the portable speaker unit functions as the vehicle subwoofer for the vehicle speaker system when the portable speaker unit is mounted in the vehicle mount and interfaced with the vehicle speaker system. In that configuration, only the subwoofer audio speaker of the portable speaker unit is operative while mounted in the vehicle mount. In other embodiments, all speakers in the portable speaker unit are operative when mounted in the vehicle mount. In one embodiment, when the portable speaker unit interfaces with the vehicle speaker system, audio signals received from the vehicle speaker system are transmitted directly to the one or more audio speakers, bypassing one or more elements of the electronic circuitry.

In another aspect, the rechargeable battery of the portable speaker unit can power the portable speaker unit or be charged through a USB or electric port when unmounted and can be charged through the portable speaker unit's electrical interface when mounted to the vehicle mount or charging dock. The rechargeable battery may include lithium-ion cells and/or lithium polymer cells. Although the term rechargeable battery is used, it should be understood that in some embodiments, either single-use batteries or fuel cells may instead be used to power the portable speaker unit, and that such configurations fall within the present disclosure. The rechargeable battery may include multiple cells connected in parallel, in series, or in a combination of series and parallel connections. In one implementation the rechargeable battery is removable from the portable speaker so to prolong portable speaker unit use between recharging. In another implementation, the rechargeable batteries may also be charged with the vehicle mount, charging dock, or electrical connector when removed from the portable speaker unit. In another implementation, multiple rechargeable batteries can be connected to the portable speaker unit simultaneously.

In one aspect, the electronic circuitry for the portable speaker unit may include one or more processor, memory including both storage capacity and RAM (random access memory), a wireless chip and antenna, power management circuitry, and one or more visual indicators (e.g. one or more LEDs, screens, or projectors). The processor and memory operate to control the portable speaker unit and to store information, including media, security settings, and sound profiles. The one or more wireless chips and antennae may include Bluetooth®, WiFi®, cellular, 4G, AM radio, FM radio, satellite radio, and/or Airplay®. In one aspect, the portable speaker unit includes Bluetooth wireless communication capabilities, and may pair with the vehicle speaker system and/or a mobile device. Through Bluetooth, the portable speaker unit can wirelessly play media from the receiver of the vehicle speaker system, even when unmounted. The portable speaker unit may also connect to an electronic device through Bluetooth to play media. The electronic circuitry may include capability for wireless charging (e.g. Qi wireless charging or some other wireless charging system). The portable speaker unit may be wirelessly powered from the vehicle mount. The portable speaker may wirelessly charge an external device such as a smartphone. The power management circuitry controls the charge and discharge of the rechargeable battery to optimize battery life and ensure safety. The power management circuitry also sends a signal to the visual indicators regarding the current charging status or battery charge level. The visual indicators may visually represent charge level, Bluetooth connection status, charging status, power (e.g., on, off, standby), or may be used to display videos, pictures, or visualizations.

In another aspect, the mechanical interfaces may secure the portable speaker unit to its vehicle mount or to a charging dock. The mechanical interfaces are capable of physically securing the portable speaker unit in a designated location (e.g., the vehicle mount) in a vehicle. The housing may be formed of metal, wood, or plastic, or any combination of materials sufficiently durable to protect the functional elements. The mechanical interfaces may be a series of shaped protrusions and indents that fit perfectly with corresponding elements in the vehicle mount to secure the portable speaker unit in place. The mechanical interfaces may also include other known means for fastening items including hooks, latches, straps, snaps, hook-and-loop fasteners, screws, or clamps. The mechanical interface may include a lock that secures the portable speaker unit to the vehicle mount interfaces for theft deterrence. The mechanical interfaces may be designed to seamlessly integrate the portable speaker unit design into the vehicle and speaker system design.

In another aspect, the electrical interfaces on the externally or outwardly positioned walls or surface of the portable speaker unit in the form of electrical connectors are provided at one or more defined locations on an outwardly positioned surface or wall of the portable speaker unit to provide an electrical interface that corresponds to a mount electrical interface on the vehicle mount or charging dock when the portable speaker unit is mounted to the vehicle mount or charging dock. The electrical interfaces may be provided in one or more discrete groups and locations. In one implementation, an electrical connector in the form of a multi-pin connector that includes at least one pin being allocated to transmitting power and at least one pin being allocated to transmit audio. The electrical interface may automatically engage a mount electrical interface when the mechanical interface is engaged with a mount mechanical interface. The electrical interface may be capable of transmitting a signal that activates the mechanical interface. The electrical interface may include physical wires, contact pans, POGO pins, or magnetic contacts. The portable speaker unit may receive a signal from the vehicle speaker system through the electrical interface that instructs the portable speaker unit to operate seamlessly as an element of the vehicle speaker system.

The housing may be durable and waterproof or water resistant to protect the functional elements of the portable speaker unit, and to provide additional shock absorbance, enhanced cosmetic appearance, and access to buttons/controls. The housing incorporates mechanical and electrical interfaces for mounting and interfacing with the vehicle dock. The housing may also include a passive radiator. The housing may include feet or stands that dampen vibration between the speaker and either the vehicle mount or underlying surface. The housing may incorporate one or more mount hooks, mount holes, and/or extendible stands capable of securely maintaining the portable speaker unit in a user-desired orientation or position. The portable speaker unit further includes a durable handle that is connected to the housing and provides a mechanical means to carry the portable speaker unit and to remove the portable speaker unit from its vehicle mount.

In another aspect, the portable speaker unit includes external controls and various ports to facilitate data and power transfer. In some implementations of the vehicle mount, these ports may serve as additional charging ports or communications ports for vehicle occupants. In one implementation, the ports and/or buttons may be protected and sealed by a latched cap with a watertight seal when not in use.

In another aspect, the vehicle mount may include a housing and circuitry contained therein and the vehicle speaker system may include one or more vehicle mounts. Each vehicle mount may be independently powered or configured to be powered by the vehicle electrical system, and receive audio from the vehicle speaker system to which it is connected. Vehicle mounts may be located in a vehicle trunk, beneath or behind the front seats, beneath or behind rear seats, or between occupant seats. Vehicle mounts may alternatively or additionally be built into the vehicle floor, vehicle ceiling, vehicle sidewalls, or vehicle doors or hatches. In some embodiments, a vehicle may include external vehicle mounts. In one implementation, the portable speaker unit is reversibly mountable to the vehicle mounts, and portable speaker units can be seamlessly mounted to any of the vehicle mounts, while in alternative embodiments, portable speaker units are adapted to fit in only one or some preferential vehicle mounts. In another implementation, portable speaker units may be upgraded and the upgraded portable speaker unit will integrate seamlessly with the pre-existing vehicle mounts.

Each of the foregoing various aspects, together with those set forth in the claims, described in the drawings and written description provided or otherwise disclosed in this patent document may be combined to form claims for a device, apparatus, system, methods of manufacture and/or use in any way disclosed herein without limitation.

DESCRIPTION OF THE DRAWINGS

These and other features, aspects and advantages, as to its structure, operation, and manufacture are described below with reference to the drawings, in which like reference numerals refer to like parts throughout. Though components in the figures are often illustrated to scale, emphasis of these drawings is placed upon illustrating the principles of the various inventive aspects disclosed herein. Moreover, all illustrations are intended to convey concepts, where relative sizes, shapes and other detailed attributes may be illustrated schematically rather than literally or precisely.

DETAILED DESCRIPTION OF THE EMBODIMENTS

Disclosed herein is a speaker system that includes a portable speaker unit that is configured to mechanically and electrically interface to a vehicle mount or charging dock to receive power and audio signals to operate as an element of the vehicle speaker system and to disengage from the vehicle mount to operate as a satellite or stand-alone portable wireless speaker. The embodiments disclosed herein are described in the context of a wireless, battery powered, mobile stereo speaker including a subwoofer. However, it should be understood that the teachings herein may be applied to other types and configurations of speakers and the mount, capabilities, and attachment interfaces described herein with regard to the portable speaker unit may also be employed with respect to other speaker configurations, mounted components and/or accessories. In addition, it should be understood that the teachings herein can be applied to more than stand-alone speakers. Indeed, it is contemplated that the teachings herein can be equally applicable to any device form-factor that employs a speaker, including and not limited to televisions, monitors, and/or projectors.

Figure 7:
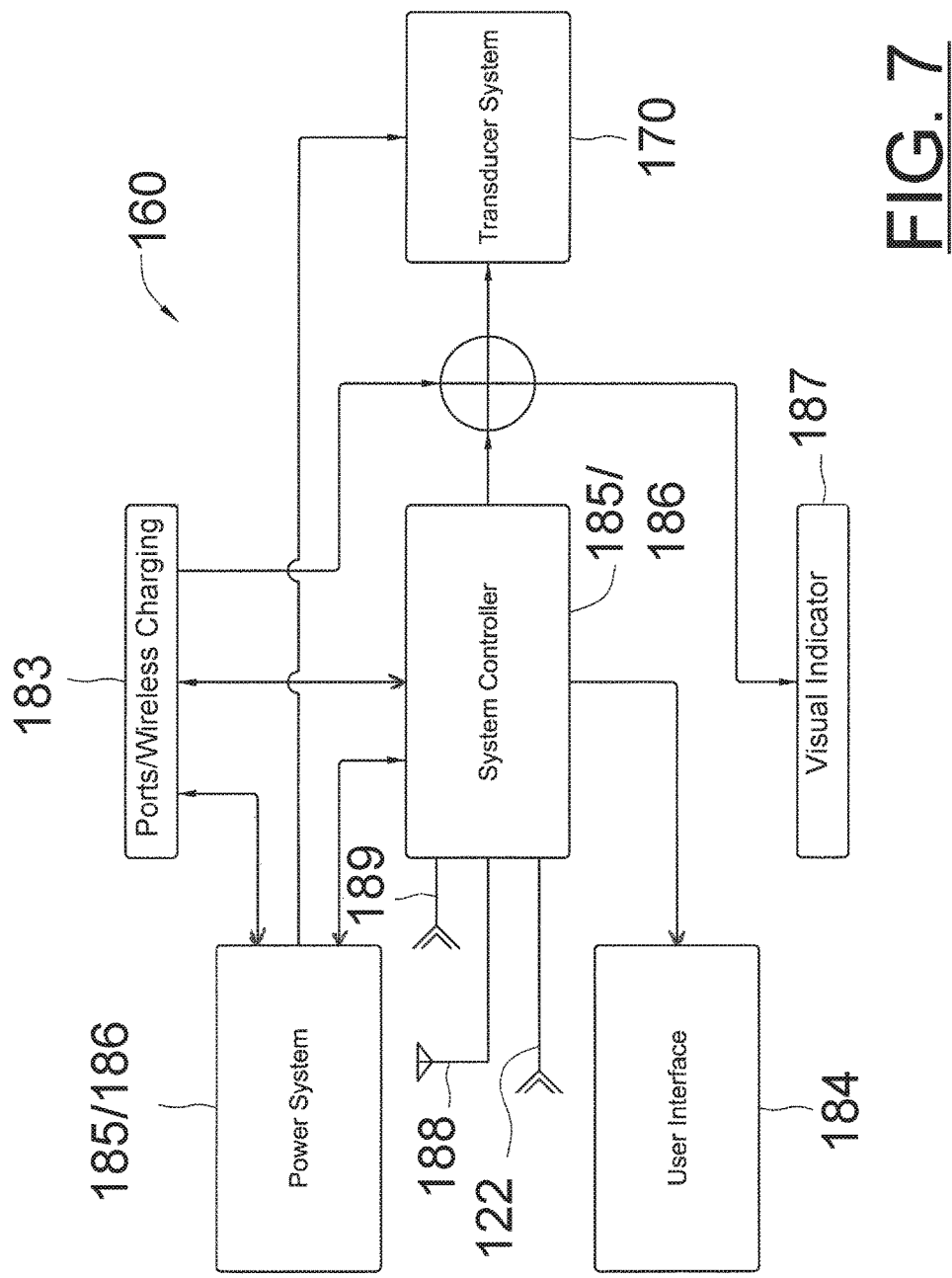
FIG. 7 is a block diagram of a representative circuit housed within the portable speaker unit of FIG. 1.
Figure 8:
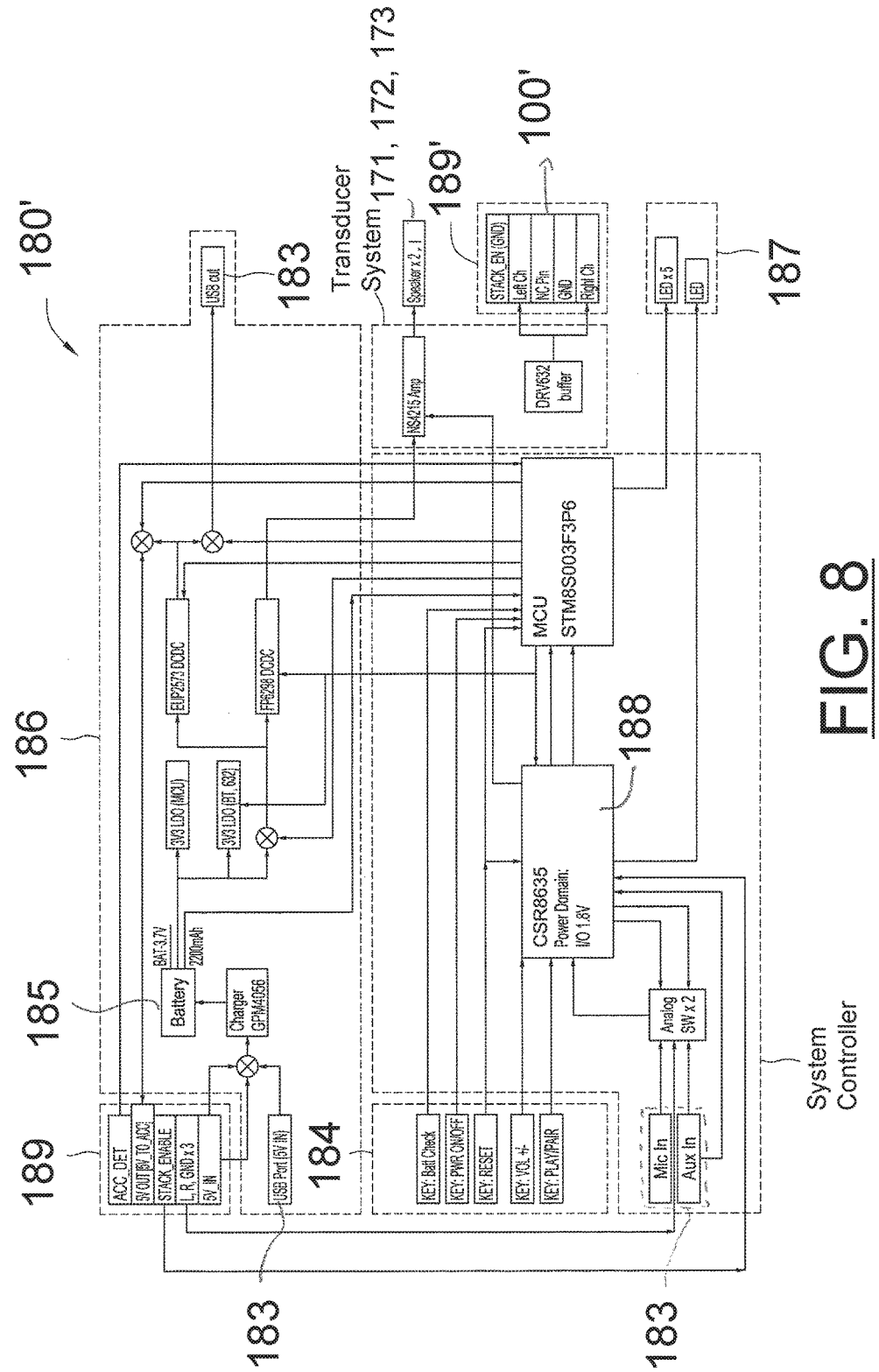
FIG. 8 is an annotated block diagram of particular circuitry and circuit components employed in an exemplary implementation of the block diagram illustrated in FIG. 7.

Illustrated in FIGS. 1-6 is an embodiment of an exemplary portable speaker unit 100 incorporating a central subwoofer 171 between a right speaker 172 and a left speaker 173, each independently sealed in separate chambers 102 within a housing 101. FIGS. 7-8 are exemplary block diagrams of functional electronics 180 contained in portable speaker unit 100.

In the exemplary embodiment, the speaker is waterproof, durable, wireless, battery-powered, and readily transportable. As used herein the term waterproof means that it is capable of withstanding immersion in one meter of water for up to 30 minutes consistent with IEC standard 60529 IPX7. Speaker 100 is depicted as being in the shape of a generally rectangular box shape that is tapered from the top to the bottom; however, it should be understood that the speaker 100 may take any shape desired. In the preferred embodiment, the speaker may be mechanically and electrically interfaced with a vehicle mount or charging dock.

As illustrated in the drawings, and with particular reference to FIGS. 1-6, the base unit 100 is a generally rectangular form including top, bottom, front, rear, left, and right surfaces 110, 120, 130, 140, 150, 160, respectively, and is comprised of a relatively rigid housing or enclosure 101 that houses the subwoofer 171, right speaker 172, and left speaker 173 each in individual chambers 102, as well as electronics 180 (including a memory 181, a processor 182, ports 183, user interfaces 184, rechargeable battery 185, power management circuitry 186, visual indicator 187, and a wireless module 188). The housing 101 may be formed of metal, wood, plastic, or any combination of materials sufficiently durable to protect the functional elements of the portable speaker unit 100. The portable speaker unit 100 is sealed against dust and liquid and reinforced for durability.

The housing 101 includes a handle 112, mechanical interfaces 131, 141, 151, 161, and electrical interfaces 189. The front, back, left, and right sides 130, 140, 150, 160 of housing 101 are generally tapered from the top surface 110 to the bottom surface 120 and include contoured features that function as mechanical interfaces 131, 141, 151, 161 to secure the portable speaker unit 100 to the vehicle mount 200. The mechanical interfaces may be a series of shaped indents 141 and protrusions 131, 151, 161 that fit perfectly with corresponding elements in the vehicle mount 200 to secure the portable speaker unit 100 in place. The mechanical interfaces may also include hooks, latches, snaps, straps, screws, clamps, or hook-and-loop fasteners. The mechanical interfaces may engage with corresponding elements of the vehicle mount interface 201. The vehicle mount interfaces 201 may physically adjust to restrain the portable speaker unit 100 until the vehicle mount interfaces 201 are intentionally released.

The housing may include a lock mechanism or lock down location 152 that secures the portable speaker unit 100 to the vehicle mount interfaces 201 to enhance theft deterrence. A corresponding vehicle mount lock 202 engages to lock down location 152 to secure the portable speaker unit 100. The vehicle mount lock 202 may be manually engaged with a key or combination or electrically engaged by the vehicle computer or a mobile device 300. Electric lock engagement may be initiated by a key fob button, key fob proximity, mobile device proximity, vocal instruction, biometric scanner, or password.

One specific implementation is a quick connect in-floor docking sub-woofer with a passive latch in the vehicle mount 200, so that when the portable speaker unit 100 is set down inside of the vehicle mount 200, the mount automatically latches and keeps the portable speaker unit 100 secure. In another implementation, the passive latch disengages when the handle 112 is lifted up from the flat position. The movement of the handle may apply pressure, releasing the latch. In some implementations, the portable speaker unit 100 can be simply removed with one hand by lifting up the handle and then pulling straight up. In an alternate implementation, the passive latch may only engage when the handle 112 is lowered to the flat position.

The top surface 110 of housing 101 includes a perforated metal grill 111 to allow sound generated by the speakers 170 to pass through the housing 101. Because the perforated metal grill 111 externally encases an already sealed housing 101, the perforations do not create a sealing issue because the chambers 102 are sealed within the housing 101 beneath the metal grill 111. The perforated metal grill may be molded to incorporate ornamental elements to compliment the aesthetic design of a vehicle interior or vehicle exterior. The speakers 170 are located behind and protected by the perforated metal grill 111.

In another aspect, the portable speaker unit 100 includes a durable handle 112 that connects to the left and right sides 150, 160 of the housing through a rotating hinge 113, and provides a mechanical means to carry the portable speaker unit and to remove the portable speaker unit 100 from the vehicle mount 200. The handle 112 allows the portable speaker unit 100 to be comfortably carried, but the handle 112 can lie flat against the housing 101 when not needed. The handle 112 may be formed of metal, plastic, aluminum, or any material sufficiently durable to carry the weight of the portable speaker unit 100. The handle 112 may include cushioning or finger-contouring for more comfortable carrying. The handle 112 may be removably or permanently mounted to the speaker housing 101. The handle 112 may be restrained against the surface of the housing 101 during audio playback or vehicle travel and/or the handle 112 and/or the housing 101 may include padding to minimize vibration and rattling.

Portable speaker unit 100 includes interfaces or external controls 184 including power, battery check and reset, volume controls, and play and pair (used to pair Bluetooth® wireless technology or other wireless devices) buttons. The play/pair button can have the dual function of initiating the playing of audio as well as activating the pairing mode to pair an electronic device. In another implementation, the external controls 184 are user accessible when the portable speaker unit 100 is outside of the vehicle mount 200 but inaccessible when the portable speaker unit 100 is in the vehicle mount 200. In one implementation, the external controls 184 are user accessible both when the portable speaker unit 100 is mounted or unmounted with the vehicle mount 200.

Various ports 183, including one or more USB (Universal Serial Bus) and/or other multi-purpose ports (e.g. Firewire, Lightning, Thunder, HDMI, etc.) to facilitate communication and/or transfer power to and from the portable speaker unit 100. The portable speaker unit 100 may receive power to charge the rechargeable battery 185 from or transfer power from the rechargeable battery 185 to the vehicle, external power sources, audio sources, external accessories, mobile devices, satellite speakers and/or audio inputs including. Ports 183 may also include headphone, microphone and/or auxiliary ports. In another implementation, the ports 183 of the portable speaker unit 100 remain accessible when the portable speaker unit 100 is mounted in the vehicle mount 200. In some vehicle mount locations, these ports 183 may serve the purpose of additional charging ports or communications ports for vehicle occupants.

In one implementation, the user interfaces 184 and/or ports 183 are sealed by gaskets to protect from liquid or dust ingress. In another implementation, ports 183 and/or controls 184 may be protected and sealed by a latched cap with a watertight seal when not in use. A single cap may cover some or all ports 183 or alternatively each port 183 may include its own dangling port cover. In one embodiment, there is no user interface on the portable speaker unit 100, and the user interface is instead incorporated into an app that can remotely control the speaker from a mobile device or from the vehicle.

As previously noted, the speaker base unit 100 includes a top surface 110, a bottom surface 120, a front surface 130, a rear surface 140, a left surface 150, and a right surface 160 that surround an internal housing 101. Front surface 130, rear surface 140, left surface 150, and right surface 160 are located between top surface 110 and bottom surface 120.

Figure 1:
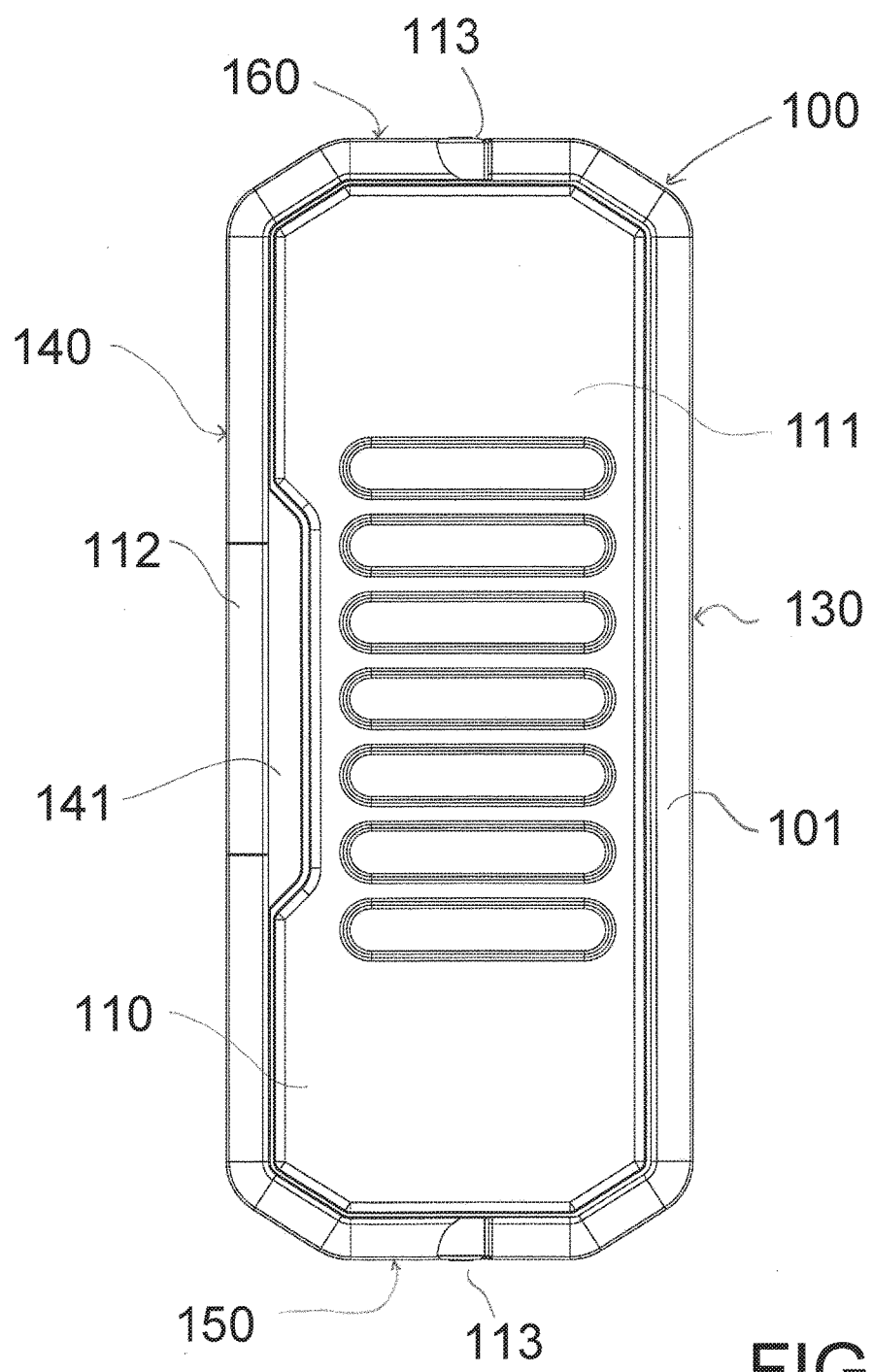
FIG. 1 is a top view of a representative fully assembled portable speaker unit in accordance with the teachings herein.

FIG. 1 clearly shows the top surface 110 of portable speaker unit 100, the interior of which is primarily covered by perforated metal grill 111. Beneath perforated metal grill 111, subwoofer 171, right speaker 172, and left speaker 173 are mounted to the top of the housing 101 with the speaker cones facing outward (or upward). Hinged handle 112 forms approximately half of the outer perimeter of top surface 110 when the handle 111 is in the flat or unused position. Handle 112 connects from a hinge 113 at the top of left surface 150 to a hinge 113 at the top of right surface 160. Handle 112 can be easily gripped due to the cavity 141 built into rear surface 140. Cavity 141 operates as a mechanical interface, as the deep and distinct cut-out shape assures that users cannot unintentionally damage the portable speaker unit 100 by inserting it backward in vehicle mount 200. Cavity 141 also serves as a hand access point for handle 112.

Figure 2:
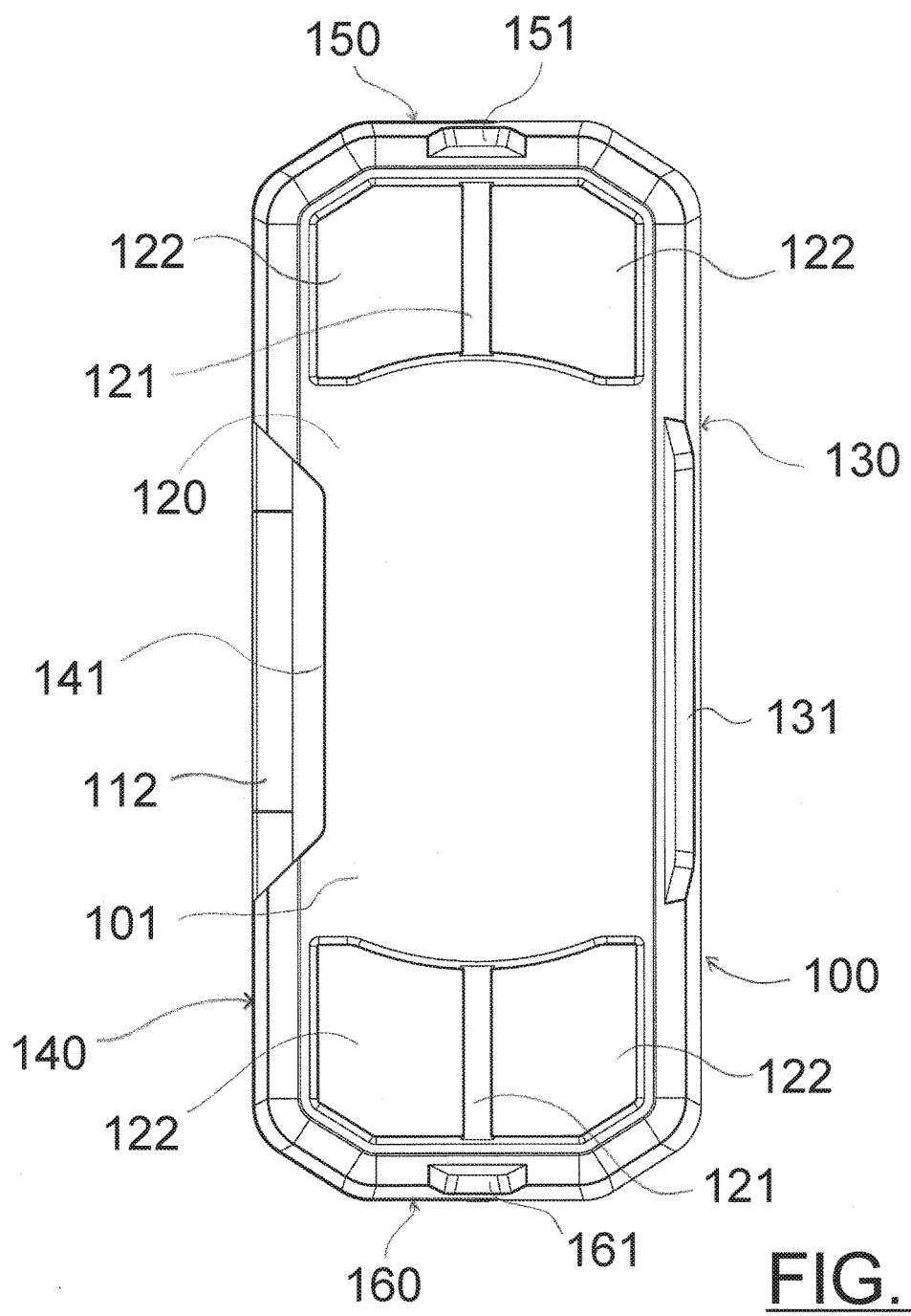
FIG. 2 is a bottom view of the portable speaker unit of FIG. 1.

FIG. 2 clearly shows bottom surface 120, which is disposed on the opposite side of housing 101 from top surface 110. Bottom surface 120 has a smaller silhouette than top surface 110 because of the tapered surfaces between top surface 110 and bottom surface 120. Bottom surface includes legs 121 near the right surface 160 and left surface 150. Each leg ends in a contact pad 122 capable of electrically interfacing with a corresponding electrical contact in the vehicle mount 200 or charging dock.

Figure 3:
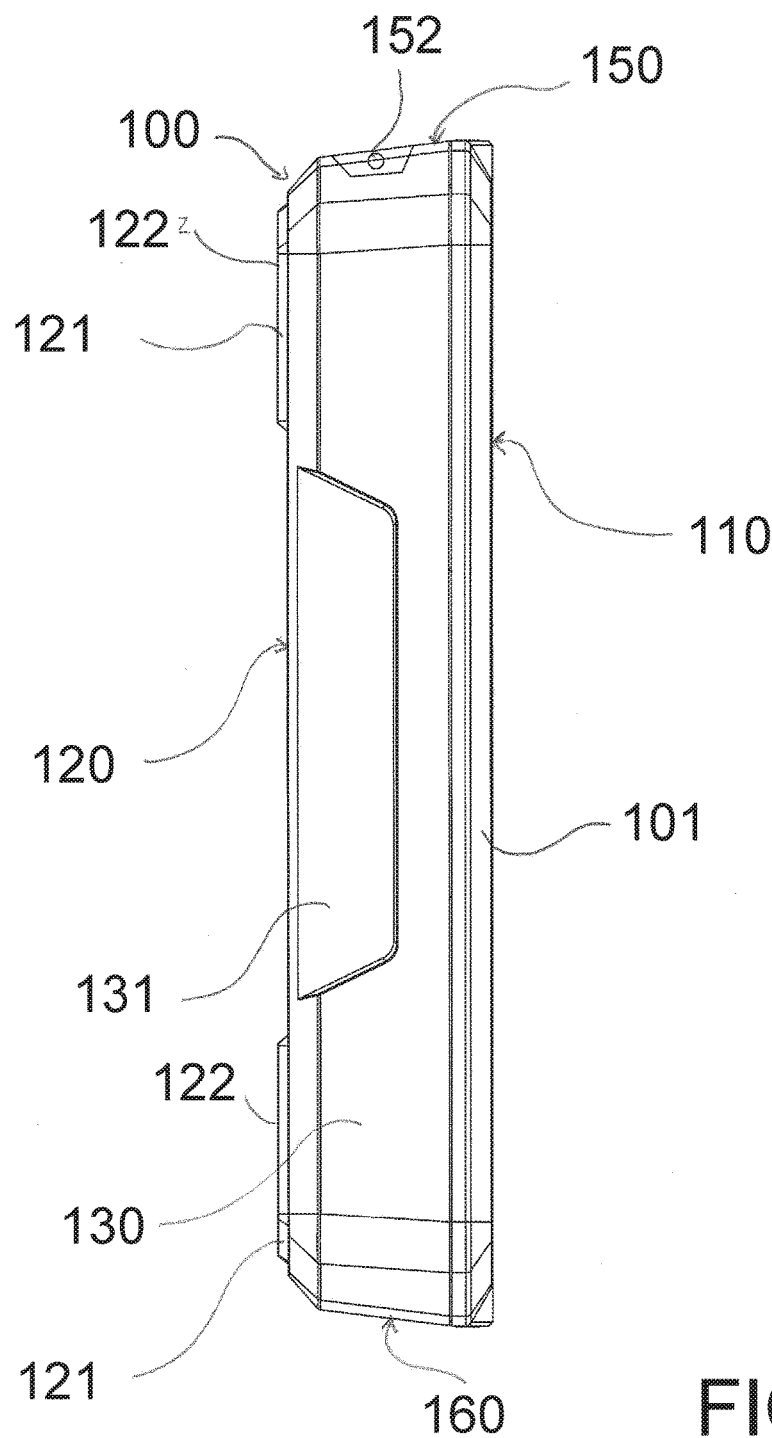
FIG. 3 is a front view of the portable speaker unit of FIG. 1.

FIG. 3 clearly shows front surface 130, the lower half of which includes a broad roughly trapezoidal protrusion 131 from front surface 130 approximately midway between left surface 150 and right surface 160. Protrusion 131 functions as a mechanical interface to assist in securely mounting portable speaker unit 100 in vehicle mount 200 or charging dock.

Figure 4:
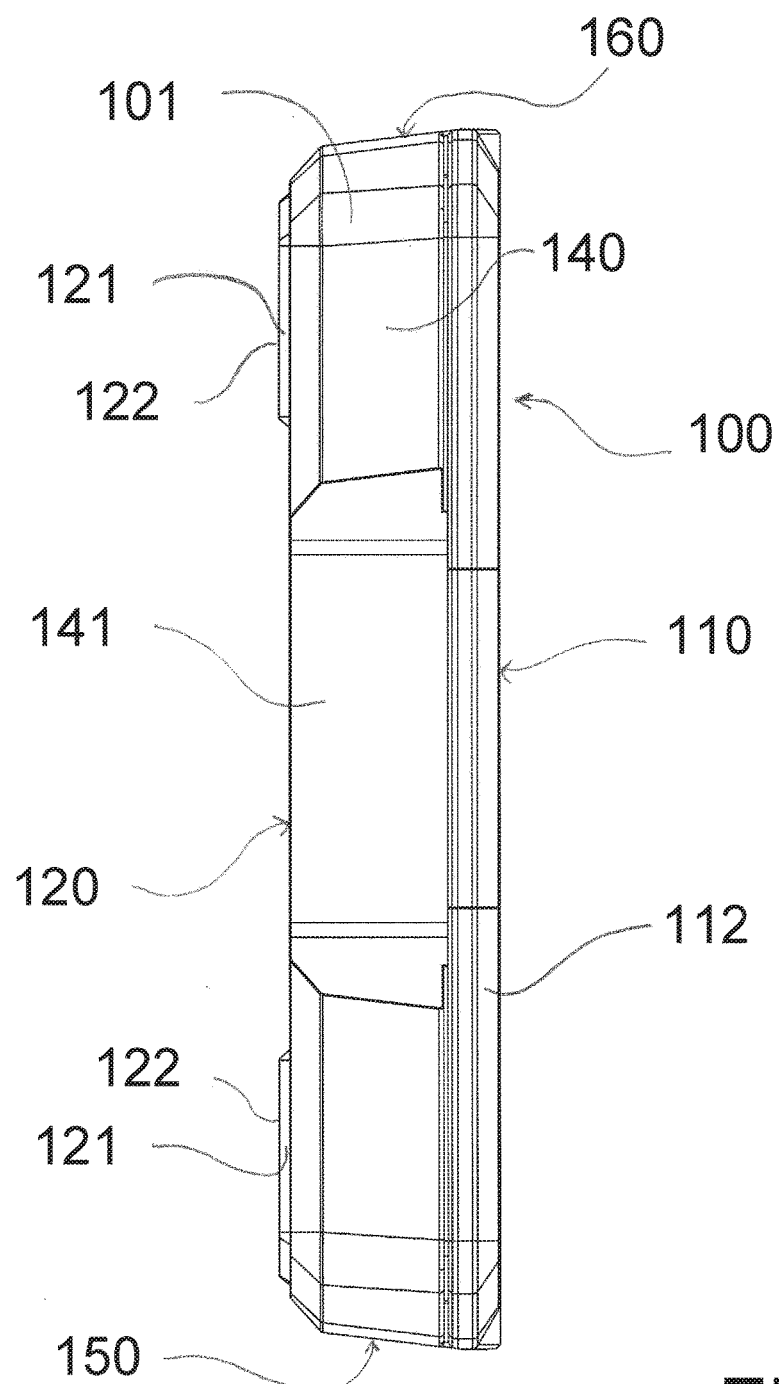
FIG. 4 is a rear view of the portable speaker unit of FIG. 1.

FIG. 4 clearly shows rear surface 140, which includes a cavity or indent or depression 141 that is located approximately midway between left surface 150 and right surface 160 and extends from the bottom surface 120 to top surface 110. Handle 112 overhangs indent 141 when the handle lies flat against top surface 110. As previously discussed in connection with FIG. 1, indent 141 functions as a mount-guide and mechanical interface to assist in securely mounting portable speaker unit 100 in vehicle mount 200 or charging dock.

Figure 5:
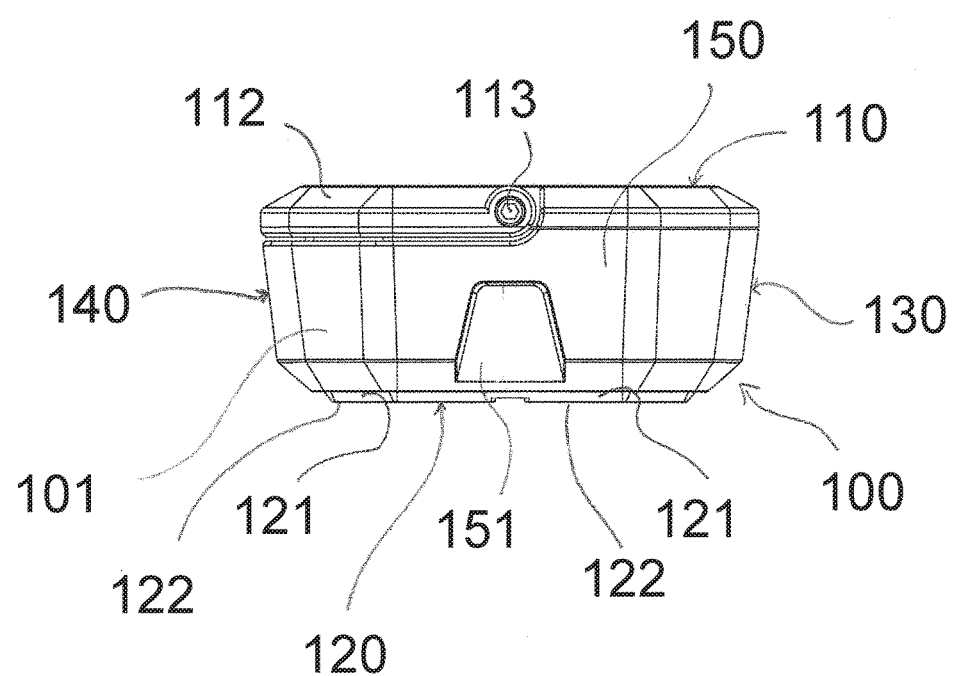
FIG. 5 is a left view of the portable speaker unit of FIG. 1.
Figure 6:
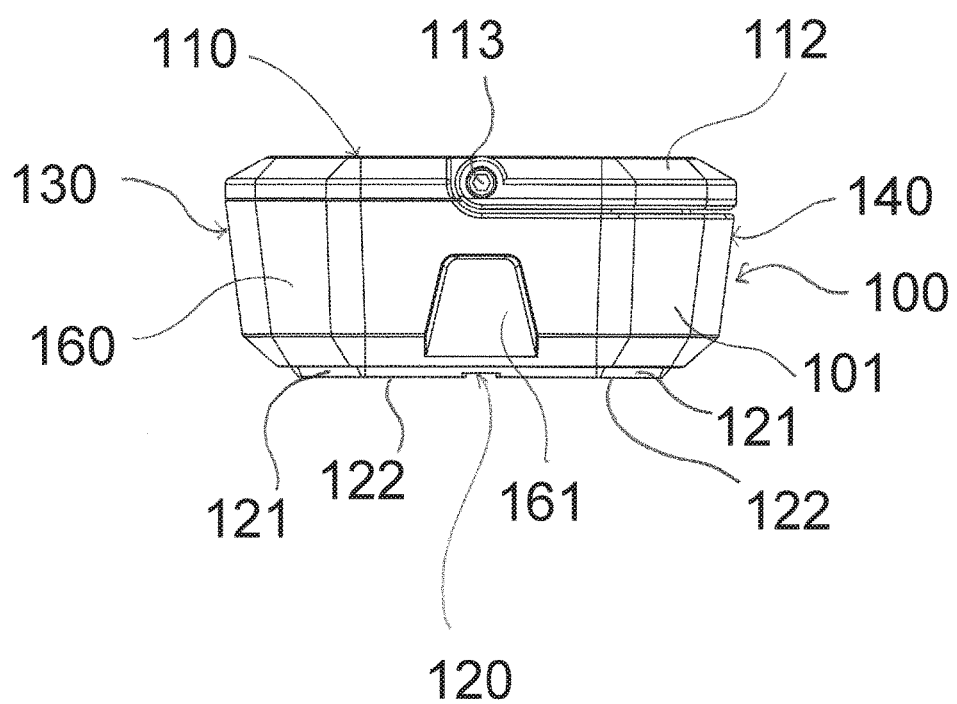
FIG. 6 is a right view of the portable speaker unit of FIG. 1.

FIGS. 5 and 6 clearly show the left surface 150 and right surface 160, each of which includes a narrow roughly trapezoidal protrusion 151, 161 from left and right surfaces 150, 160 approximately midway between front surface 130 and rear surface 140. Protrusions 151, 161 are located just above bottom surface 120 and are approximately half the height of the portable speaker unit. Along with indent rear 141 and front protrusion 131, left and right protrusions 151, 161 function as guide-tracks and mechanical interfaces to assist a user in properly and securely mounting portable speaker unit 100 in vehicle mount 200 or charging dock. Because of the contoured form of the housing 101, and the precisely corresponding contoured form of the cavity in vehicle mount 200, portable speaker 100 is held firmly in place with little to no lateral shifting or vibration. With minimal downward pressure from the vehicle mount fasteners secures the angled edges of the portable speaker unit 100 in the vehicle mount 200 completely cancelling any and all annoying vibration between the speaker and mount.

Housing 101 includes a plurality of independently sealed speaker chambers 102 for each of the speakers 170. Each independently sealed speaker chamber 102 may also include a passive driver (not shown). The top side 110 includes a perforated metal grill 111 that covers the speaker elements 170 and passive driver cones. The metal grill 111 protects the speaker cones from damage and the perforations are provided to allow sound waves, generated by the vibration of a speaker 170 or passive driver to pass through the housing 101 to the external environment. Although not fully depicted the speakers 170 are generally circular cone radiators mounted on the top side 110 of the housing 101 facing outward from the speaker chamber 102.

The housing 101 may be comprised of a unitary integrally formed polymer molded or extruded construct that includes internal chambers 102 and multiple apertures for the speaker radiators and additional passage required for functional electronics 180, such as USB communication or charging ports, power connector, audio connector, Ethernet connection (collectively 183), reset or control buttons 184 or battery power indicator 187, which in the present embodiment may be housed under a sealable cap that mates with the housing 111 and protects the ports 183 and user interfaces 184 thereunder. The perforated metal grill 111 may be attached to the housing 101 via mechanical means such as screws, rivets, or latches or via adhesive means or a combination thereof, and the perforated metal grill 111 may be removed to clean or clear debris from the speakers 170 or housing 101. It should be understood, however, that the perforated metal grill 111 could be co-molded with the housing 101 and chambers 102 to form a unitary structure. The housing 101 provides internal seals between the chambers 102, allowing each speaker 170 to operate independently and unimpeded, additionally enabling the use of passive radiators. The chambers 102 and housing 101 define the internal compartments that house the speakers 170 and the electronics 180.

The portable speaker unit may include both or either wireless charging pads (not shown) for receiving a charge from the vehicle mount or wireless charging pads capable of charging electronic devices. Once power is detected in the receiving charging pad, the portable speaker unit 100 begins to inductively or wireless charge the rechargeable battery. Once connected battery power from the portable speaker unit 100 is provides to the wireless charging pad 600 to facilitate inductive or wireless charging of an electronic device having a compatible wireless charging capability. While a Qi wireless assembly is mentioned in the application, it should be understood that other wireless charging systems and standards may be employed such as those developed by Power Matters Alliance™ (PMA) and the Alliance for Wireless Power® (A4WP).

The circuitry of the speaker 100 is now described in more detail with reference to FIGS. 7-8. FIG. 7 is a block diagram of a representative circuit (functional electronics 180) housed within the housing 101 of the portable speaker unit 100 depicted in FIG. 1. FIG. 8 is a more detailed and annotated block diagram of the circuit block diagram depicted in FIG. 7. As illustrated in FIG. 7 the functional electronics 180 includes ports and wireless charging for communicating with and powering external elements 183, a power system 186 (including battery 185), a system controller (including processor 182 and memory 181), and a transducer system connected to speakers 170, a visual indicator 187, a user interface 184, wireless module 188, and electrical interfaces 189 connected to the system controller 181/182, as illustrated.

The portable speaker system can receive power from the contact pads 122 or input port 183 or receive communication from the wireless module 188. A Bluetooth wireless module 188 may connect to either the vehicle speaker system or to an electronic device. Through Bluetooth, the portable speaker unit 100 can simultaneously play the same audio as the vehicle speaker system, even after the portable speaker unit 100 is un-docked and separated from the vehicle. The Bluetooth wireless module may be "introduced" to the electronic device through the vehicle computer system, meaning that the vehicle computer system forwards the pairing information from the vehicle to the portable speaker unit 100. This introduction can be made either through the Bluetooth wireless module 188 or through the contact pads 122 or electrical interfaces 189. In one implementation, the contact pads may be the only electrical interfaces between the vehicle mount 200 and the portable speaker unit 100. Portable speaker unit 100 may include a contact pad 122 on each of the 4 legs 121. In one implementation, the 4 contact pads include an audio signal line, an audio ground, a power line, and a power ground. In another implementation, audio and power share a common ground. In some analog embodiments, each leg may include multiple contact pads, each carrying one or more signal, such as a separate contact pad 122 for the signal line of each of subwoofer 171, right channel 172, and left channel 173. In some digital embodiments, all audio may be transmitted through one contact pad 122 or electrical interface 189.

Audio comes into the speaker via the wireless module 188, the contact pad 122, the ports 183, or the electrical interface 189. Though not indicated in the block diagram, when audio is received from the electrical interface 189 or contact pads 122 (from the vehicle receiver), it can be routed directly to the audio transducer system and speakers 170, bypassing the memory 181 and processor 182. Audio received from the ports 183 can also be routed directly to the transducer system and speakers 170, if properly formatted. Alternatively, when audio is received from the wireless module 188 or ports 183, the system controller can route the audio to the audio transducer system and speakers 170, after processing and formatting the signal.

In addition to playing audio via Bluetooth 188 or through the vehicle speaker system (via 189/122), the portable speaker unit can also perform as a speaker phone if a microphone is connected to an appropriate port 183.

The power system 186 may comprise a USB input port (5V_IN) 183, a rechargeable battery 185, a charger (e.g., GPM4056), low-dropout regulators (e.g., 3V3 LDO [MCU] and 3V3 LDO [BT, 632]), a 5V DC/DC converter (e.g., EUP2573), a DC/DC boost converter (e.g., FP6298), and a USB out port 183. The rechargeable battery 185 can be charged via the charger, which receives power either from the 5V_IN line of electrical interface 189 or through the USB input port 183. The battery 185 in turn can provide power to the low-dropout regulators, one of which can be always enabled and provides power to a microcontroller (MCU, e.g., STM8S003F3P6), and another can be enabled/disabled by the MCU, which provides power to the other components of the system such as the Bluetooth (BT) controller 188.

In one embodiment, multiple portable speaker units can be stacked or connected together. In this instance, a first or master portable speaker unit can communicate with a second or slave portable speaker unit 100' through an outbound electrical interface 189'. The 5V output to the USB output 183 (or the outbound electrical interface 189', if included) can be enabled/disabled via the processor 182. The DC/DC boost converter can be powered by the battery 185 and can be enabled/disabled by the processor 182. Depending on the level of the incoming audio signal, the battery 185 may also supply power to an audio amplifier (e.g., NS4215) on the way to the speakers 170.

The system controller may include a wireless module 188 (e.g., Bluetooth module CSR8635) and the processor (e.g., STM8S003F3P6). The system controller can arbitrate among the various ports 183, the electrical interface 189, the contact pads 122, and the wireless module 188, perform audio equalization, and send the audio signal to the speakers 170. The power management circuit 185 can monitor the status of the battery 186 and update the visual indicators 187 (5 LEDS in this block diagram) to indicate the status of the battery 185. When the system battery capacity is below some threshold, the system controller or power management circuitry 186 can disable some functionality such as charging output through various ports 183 to preserve power for operating the speakers 170. The system controller can also control a separate power/pair LED of the visual indicator 187 to indicate the charging status, the connection status, or the power status of the portable speaker unit 100. When any of the user interfaces are pressed, the system controller can process the intent and act accordingly.

The user interface 184 can be composed or comprised of user I/O buttons (e.g., Battery Check, Power On/Off, Reset, Vol+/− and Play/Pair), Battery check LED, and power/pair LED. When the user presses the Battery Check button, the processor 182 and/or power management circuitry 186 can display the battery level on the visual indicator 187 (each of the 5 LEDs representing 20% of the total potential charge of the battery 185). The Vol+/− keys can change the volume of the audio with a short press and skip tracks with a long press. The Play/Pair button can have several functions, for example, play/pause music, answer/hang up/reject phone calls, initiate Bluetooth pairing, cancel Bluetooth pairing or factory reset the speaker, depending on the status of the portable speaker unit. The visual indicator 187 provide visible means by which the user can determine and operation status of the portable speaker unit.

The block diagrams 180 and 180' are only representative of one potential implementing circuit. Other circuits may also be designed to effectuate the same or similar user functionality.

As previously noted, the portable speaker unit may include one or more rechargeable battery or cells 185. The rechargeable battery 185 of the portable speaker unit 100 can power the portable speaker unit 100 or be charged through a USB or electric port 183 when unmounted and can be charged through the portable speaker unit's electrical interface 189 or contact pads 122 when mounted to the vehicle mount 200 or charging dock. The rechargeable battery 185 may include lithium-ion cells and/or lithium polymer cells. Although the term rechargeable battery is used, it should be understood that in some embodiments, either single-use batteries or fuel cells may instead be used to power the portable speaker unit, and that such configurations fall within the present disclosure. The rechargeable battery 185 may include multiple cells connected in parallel, in series, or in a combination of series and parallel connections. The rechargeable battery 185 is removable from the portable speaker unit 100 to prolong portable speaker unit 100 use between recharging, allowing a user to remove a low-charge battery and replace it with a high charge battery. In some embodiments, the rechargeable batteries may also be charged in the vehicle mount, charging dock, or by an electrical connector separate from the portable speaker unit. In another implementation, multiple rechargeable batteries can be connected to the portable speaker unit simultaneously. Multiple batteries inside of portable speaker unit 100 may be arranged in series, parallel, or a combination thereof to operate as a single battery with increased capacity and/or voltage.

While the disclosure has been described in connection with specific examples and various embodiments, it should be readily understood by those skilled in the art that many modifications, combinations, and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, combinations, uses or adaptation of the invention following, in general, the principles of the invention, and including such departures from the present disclosure as come within the known and customary practice within the art to which the invention pertains.

The invention claimed is:

1. A wireless, battery powered audio speaker system comprising:
    a portable audio speaker having a left channel speaker, a right channel speaker, a subwoofer, a mechanical interface, an electrical interface, and a USB port, the mechanical interface and electrical interface each being adapted to interface with a vehicle mount connected to a vehicle speaker system, the USB port being configured to transfer power from the portable audio speaker to external accessories;
    wherein each of the left channel speaker, the right channel speaker, and the subwoofer are sealed to a separate sealed compartment;
    wherein the portable audio speaker is waterproof;
    wherein the wireless, battery powered audio speaker functions as a vehicle speaker while interfaced with the vehicle mount; and
    wherein the wireless, battery powered audio speaker functions as a portable, wireless, battery powered speaker while not interfaced with the vehicle mount.

2. The wireless, battery powered audio speaker system of claim 1, wherein the USB port remains accessible while the portable audio speaker is interfaced with the vehicle mount.

3. The wireless, battery powered audio speaker system of claim 1, wherein a vehicle electrical interface automatically engages the electrical interface and a vehicle mechanical interface automatically engages the mechanical interface when the portable audio speaker is placed in the vehicle mount, securing the portable audio speaker to the vehicle mount and electrically coupling the portable audio speaker to the vehicle mount.

4. The wireless, battery powered audio speaker system of claim 1, wherein the portable audio speaker further comprises a movable handle and wherein the portable audio speaker automatically disengages the mechanical interface when the handle is moved to a first position.

5. The wireless, battery powered audio speaker system of claim 1, further comprising multiple vehicle mounts.

6. The wireless, battery powered audio speaker system of claim 1, wherein the portable audio speaker comprises a rechargeable battery.

7. The wireless, battery powered audio speaker system of claim 6, wherein the rechargeable battery is recharged with electricity from the vehicle through the electrical interface when the portable audio speaker is interfaced with the vehicle mount.

8. The wireless, battery powered audio speaker system of claim 1, wherein the chassis can be secured to the vehicle mount with a lock.

\* \* \* \* \*